United States Patent
Bayley et al.

(10) Patent No.: US 10,129,919 B2
(45) Date of Patent: Nov. 13, 2018

(54) VIDEO HEADSET

(71) Applicant: Plantronics, Inc., Santa Cruz, CA (US)

(72) Inventors: Antony M W Bayley, Royal Wootton Bassett (GB); Peter K Reid, Marlborough (GB); Simon Goddard, Malmesbury (GB)

(73) Assignee: Plantronics, Inc., Santa Cruz, CA (US)

( * ) Notice: Subject to any disclaimer, the term of this patent is extended or adjusted under 35 U.S.C. 154(b) by 69 days.

(21) Appl. No.: 15/299,269

(22) Filed: Oct. 20, 2016

(65) Prior Publication Data
US 2018/0115747 A1    Apr. 26, 2018

(51) Int. Cl.
| | |
|---|---|
| H04N 7/14 | (2006.01) |
| H04W 76/14 | (2018.01) |
| H04W 52/02 | (2009.01) |
| H04W 84/12 | (2009.01) |
| H04W 4/80 | (2018.01) |
| H04N 7/15 | (2006.01) |

(52) U.S. Cl.
CPC ............ *H04W 76/14* (2018.02); *H04N 7/142* (2013.01); *H04W 52/0241* (2013.01); *H04N 7/15* (2013.01); *H04W 4/80* (2018.02); *H04W 84/12* (2013.01)

(58) Field of Classification Search
CPC ............ H04W 4/008; H04W 52/0241; H04W 76/023; H04W 84/12
USPC .... 348/14.01–14.16; 370/259–271, 351–357
See application file for complete search history.

(56) References Cited

U.S. PATENT DOCUMENTS

| | | | |
|---|---|---|---|
| 8,237,856 B2 | 8/2012 | Boland et al. | |
| 8,526,779 B2 | 9/2013 | Simmons et al. | |
| 8,593,570 B2 | 11/2013 | Boland et al. | |
| 2008/0139118 A1* | 6/2008 | Sanguinetti | H04B 1/406 455/41.2 |
| 2010/0039493 A1* | 2/2010 | Chao | G02B 27/017 348/14.02 |
| 2010/0118158 A1* | 5/2010 | Boland | H04N 5/23203 348/211.2 |
| 2010/0245585 A1* | 9/2010 | Fisher | H04M 1/6066 348/164 |

(Continued)

OTHER PUBLICATIONS

Unknown, Google Glass from Wikipedia, the free encyclopedia, 15 pages, found at URL <https://en.wikipedia.org/wiki/Google_Glass>, on market as early as 2013.

(Continued)

*Primary Examiner* — Hemant Patel
(74) *Attorney, Agent, or Firm* — Chuang Intellectual Property Law

(57) ABSTRACT

Methods and apparatuses for video headsets are described. In one example, both a Bluetooth link and a Wi-Fi link are established between a video headset and a computing device, the Bluetooth link and the Wi-Fi link in operation concurrently. A user speech is received at a video headset microphone during a voice call, and a far end call participant speech is output at a video headset speaker during the voice call. A video is captured with a video headset video camera during the voice call. The user speech is transmitted over the Bluetooth link from the video headset to the computing device and the video is transmitted over the Wi-Fi link from the video headset to the computing device.

22 Claims, 8 Drawing Sheets

(56) References Cited

U.S. PATENT DOCUMENTS

| | | | | |
|---|---|---|---|---|
| 2012/0275319 | A1* | 11/2012 | Peiris | H04M 1/7253 370/252 |
| 2013/0065637 | A1* | 3/2013 | Tasker | H04M 1/6066 455/553.1 |
| 2013/0239000 | A1* | 9/2013 | Parkinson | G06F 3/017 715/728 |
| 2014/0185494 | A1* | 7/2014 | Yang | H04W 56/0005 370/280 |
| 2016/0212375 | A1* | 7/2016 | Reitel | H04N 7/147 |
| 2016/0344984 | A1* | 11/2016 | Fitzgerald | H04N 5/7491 |

OTHER PUBLICATIONS

Unknown, "LOOXCIE 2," User Manual for Android Model LX2, 37 pages, found at URL <https://www.bhphotovideo.com/lit_files/45530.pdf>, copyright 2011.

\* cited by examiner

United States Patent No. 10,129,919 B2

VIDEO HEADSET

BACKGROUND OF THE INVENTION

The intersection of wireless audio communications, video communications, mobile computing devices, mobile phones, and the Internet have revolutionized the manner by which people can communicate. For example, not only can people receive voice calls on their mobile phones at any location and time, they can receive video calls as well.

Headsets have correspondingly increased in functionality as processing power has increased. However, design of headsets presents unique challenges as competing considerations must be addressed due to their unique form factor. For example, users desire the headset to have a minimal size so as to be comfortable and less conspicuous when worn. On the other hand, users wish their headset to have a maximal battery life. For example, the headset standby time is important to users in addition to active operation time. With increased functionality, battery power consumption may be significantly increased. Since the smaller form factor of headsets limits the physical size of headset batteries, power management in headsets is of significant importance.

Furthermore, with increased functionality, complexity of device operation increases and user interface issues associated with ease of use and efficiency arise. Headsets which offer multiple features, are easy to use, and offer acceptable battery life are desired. As a result, improved methods and apparatuses for headsets are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
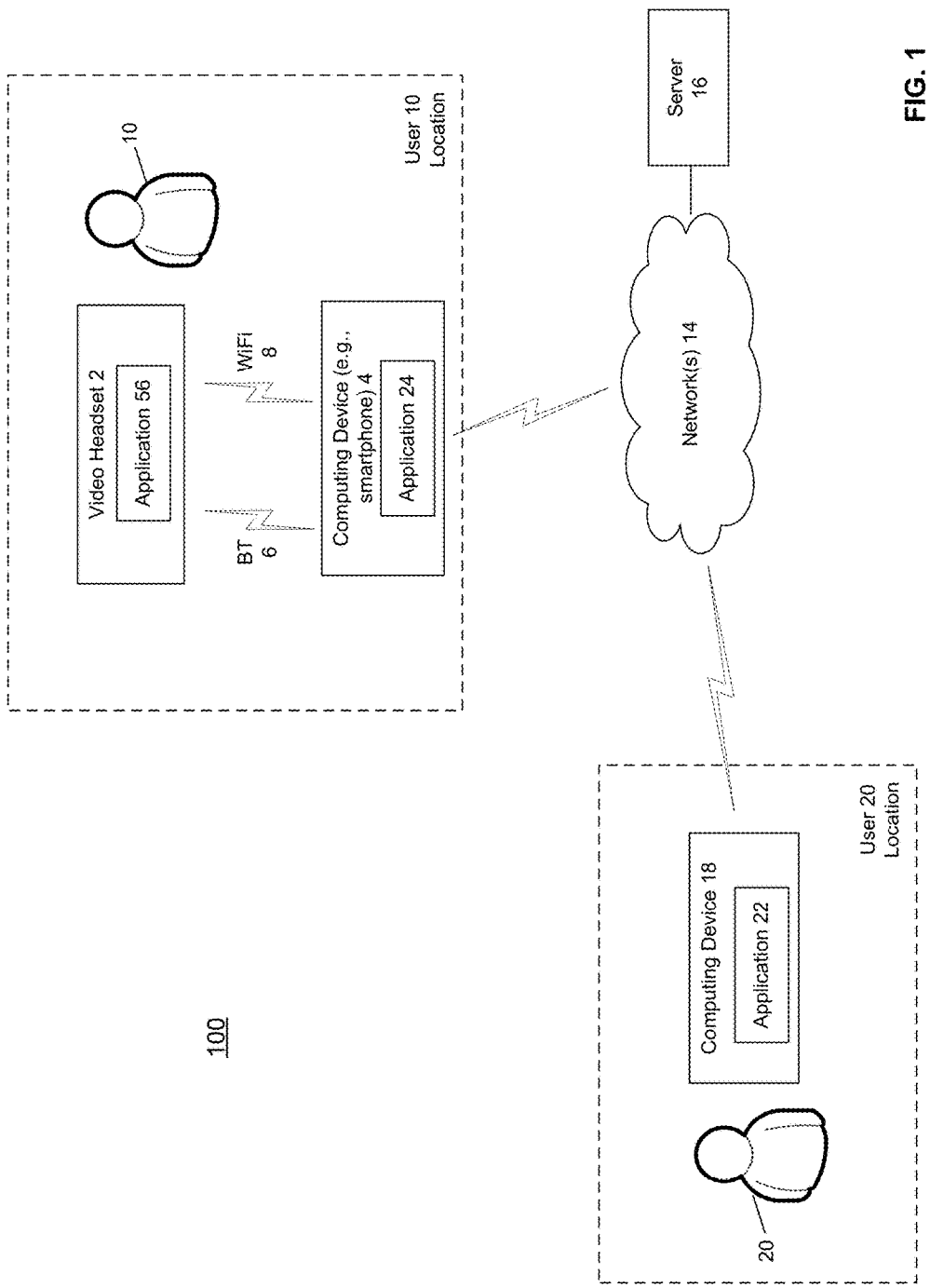
FIG. 1 illustrates a system for operating a video headset in one example.

Methods and apparatuses for video headsets are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various examples of the invention, although different, are not necessarily mutually exclusive. Thus, a particular feature, characteristic, or structure described in one example embodiment may be included within other embodiments unless otherwise noted.

In one example of the invention, a method includes forming both a Bluetooth link and an IEEE 802.11 (hereinafter referred to as Wi-Fi) link between a video headset and a computing device, the Bluetooth link and the Wi-Fi link in operation concurrently. The method further includes inputting a user speech at a video headset microphone during a voice call, and outputting a far end call participant speech at a video headset speaker during the voice call. The method includes capturing a video with a video headset video camera during the voice call. The method further includes transmitting the user speech over the Bluetooth link from the video headset to the computing device and transmitting the video over the Wi-Fi link from the video headset to the computing device.

In one embodiment, this method further includes terminating the Wi-Fi link following termination of the video transmission and entering a power save mode at a video headset Wi-Fi module. The method includes receiving a video camera control message over the Bluetooth link between the video headset and the computing device. The method further includes exiting the power save mode at the video headset Wi-Fi module and forming a Wi-Fi link between the video headset and the computing device responsive to the video camera control message received over the Bluetooth link.

In one example, a video headset includes a battery, a microphone, a speaker, and a Wi-Fi enabled camera module. The Wi-Fi enabled camera module includes a camera video sensor, a camera microphone, a camera processor, a system processor, and a Wi-Fi communications interface. The video headset further includes a Bluetooth enabled module. In one example, the Bluetooth enabled module includes a processor, a Bluetooth communications interface, and a memory storing an application program. The application program includes executable instructions to conduct a voice call over a Bluetooth link utilizing the Bluetooth communications interface. The video headset further includes a control and status interface linking the Wi-Fi enabled camera module and the Bluetooth enabled module. The application program running on the Bluetooth enabled module sends a control signal to the camera module that causes it to transmit a video over a Wi-Fi link utilizing the Wi-Fi communications interface, wherein the Bluetooth link and Wi-Fi link are in operation simultaneously.

In one embodiment, the application program further includes executable instructions to receive a control message on the Bluetooth communication interface and transmit the control message over the control and status interface linking the Wi-Fi enabled camera module and the Bluetooth enabled module. The Wi-Fi enabled camera module is transitioned from a power save mode to a full power mode responsive to the control message.

In one example, a method includes beginning a communications session between a wearer of a video headset and a far end participant. The method further includes forming a first communications protocol link (e.g., Bluetooth) between the video headset and a computing device. The method includes receiving a user speech at a microphone at the video headset and outputting a far end participant speech at a speaker at the video headset during the communications session. The method further includes transmitting the user speech over the first communications protocol link from the video headset to the computing device. The method includes forming a second communications protocol link (e.g., Wi-Fi) between the video headset and the computing device, the second communications protocol link in operation concurrently with the first communications protocol link. The method further includes capturing a video with a video camera at the video headset during the communications session, and transmitting the video over the second communications protocol link from the video headset to the computing device. The first communications protocol provides less bandwidth but utilizes less power whereas the second communications protocol provides greater bandwidth but utilizes more power.

In one example, a video headset is operated in a use case where video streaming or recording, or capture of digital images, occurs at the same time as 2-way voice communications (e.g., a telephone call, radio conversation, etc.) and the video, photographs, ambient sound and communications speech are contextually related. In one embodiment, the video headset combines standard telephony headset functions with a video camera that can record what the headset-wearer sees, broadcast the live video stream for remote viewing by the headset-wearer's colleagues, capture still images or perform any combination of these actions, whilst having their hands free to carry out repairs, control of equipment, carrying out lifesaving procedures, etc. In one embodiment the video camera includes a microphone that captures ambient sound. Combining 2-way voice communications with simultaneous transmission of digital photographs, video and ambient sound provides a richer communication experience than voice telephony or picture messaging on their own. The video headset achieves higher video resolution than possible utilizing Bluetooth by using Wi-Fi for video streaming. In one example, the video headset records video at 720p 30 fps and streams video at 640p 30 fps. Advantageously, the video headset minimizes the high power consumption associated with Wi-Fi communication by powering the Wi-Fi interface only when video streaming is active. The video camera is controlled and configured using a lower-power Bluetooth connection.

The video headset is easy to use, comfortable to wear, and implementable with good battery life. In one example, the video headset advantageously utilizes a modular design, with a clearly defined cable or wireless interface between a Wi-Fi-connected camera module and a Bluetooth module for control and status messages. This modular design enables product variants with different form factors to be created quickly and easily for specific applications. Control and status messages transferred between the Bluetooth headset module and the Wi-Fi-connected camera module enable features that cannot be provided just by combining a stand-alone headset and IP webcam.

A voice user interface may be utilized to control the headset, the camera/video camera, power saving modes, and attached peripherals such as the video headset's clip-on laser pointer and flashlight. The Bluetooth module processes audio from the headset microphone. When it detects a voice command it sends the corresponding control message to the camera module, which can start video recording with audio detected from independent camera microphones, leaving the Bluetooth microphones free to resume voice command/control.

Wi-Fi is used for video streaming, to support high resolution including 720p 30 fps (e.g., DVD quality video). However, in one example, to minimize power consumption, the headset's Wi-Fi interface is only enabled when video streaming is active. The headset and camera cannot be configured and controlled over Wi-Fi, since the headset's Wi-Fi interface is only enabled when video streaming is active. Instead the headset is configured over Bluetooth, from a connected smartphone, tablet or computer. Headset and camera status messages are also sent back to the connected device over the Bluetooth link.

Camera configuration and control messages are received by the headset's Bluetooth module and relayed to the camera via the headset's internal control and status interface. For example, the interface is a 4-wire bidirectional serial port routed through the neckband that links the camera and headset sub-assemblies. Camera status messages are relayed back to the Bluetooth module and connected device via the same route.

If the connected smartphone, tablet or computer is connected to the Internet and is running a video headset application that connects to a remote web-client via a server or direct peer to peer connection, then the web-client can configure and control the headset and camera by sending messages over an IP network control channel. The smartphone application receives these messages and relays them to the headset over the Bluetooth connection. This enables the camera to be remotely controlled via the Internet without enabling its power-intensive Wi-Fi interface.

One particular use case for remote control of the camera over the Internet is to enable a remote party viewing the headset's live video stream in a web client to focus and zoom the camera. The principle is that the remote party viewing a video stream is best placed to adjust its image quality. Voice prompts output at the video headset speaker inform the headset wearer if a remote client takes control of his headset (e.g. if a remote viewer starts or stops the live video stream).

FIG. 1 illustrates a system for operating a video headset in one example. A user 10 is at a user 10 location and a user 20 is at a user 20 location. At the user 10 location, the system includes a video headset 2 operable to form a Bluetooth link 6 and a Wi-Fi link 8 with a computing device 4. Video headset 2 executes embedded software and a command and control application 56 (together hereinafter referred to also as simply application program 56). In one example, the embedded software and command and control application 56 are integrated into a single application. Computing device 4 is in communication with network(s) 14. Network(s) 14 may include one or more communications networks, including for example, a cellular communications network, an Internet Protocol (IP) network, the PSTN network, or a Private Branch Exchange (PBX). Although shown as wireless links, communication with network(s) 14 may utilize either wired or wireless links.

Computing device 4 may, for example, be a smartphone, tablet computer, or laptop computer. An application program 24 resides on computing device 4 which operates in conjunction with application program 56 at video headset 2. In one example, application program 24 further operates in conjunction with a cloud server 16 coupled to network(s) 14.

At the user 20 location, the system includes a computing device 18 in communication with network(s) 14. In one example, computing device 18 executes a client application program 22 which operates in conjunction with cloud server 16. In a further example, client application program 22 operates directly in conjunction with application program 24 residing at computing device 4 without the use of server 16. Computing device 18 may, for example, be a smartphone, tablet computer, or laptop computer.

Figure 2:
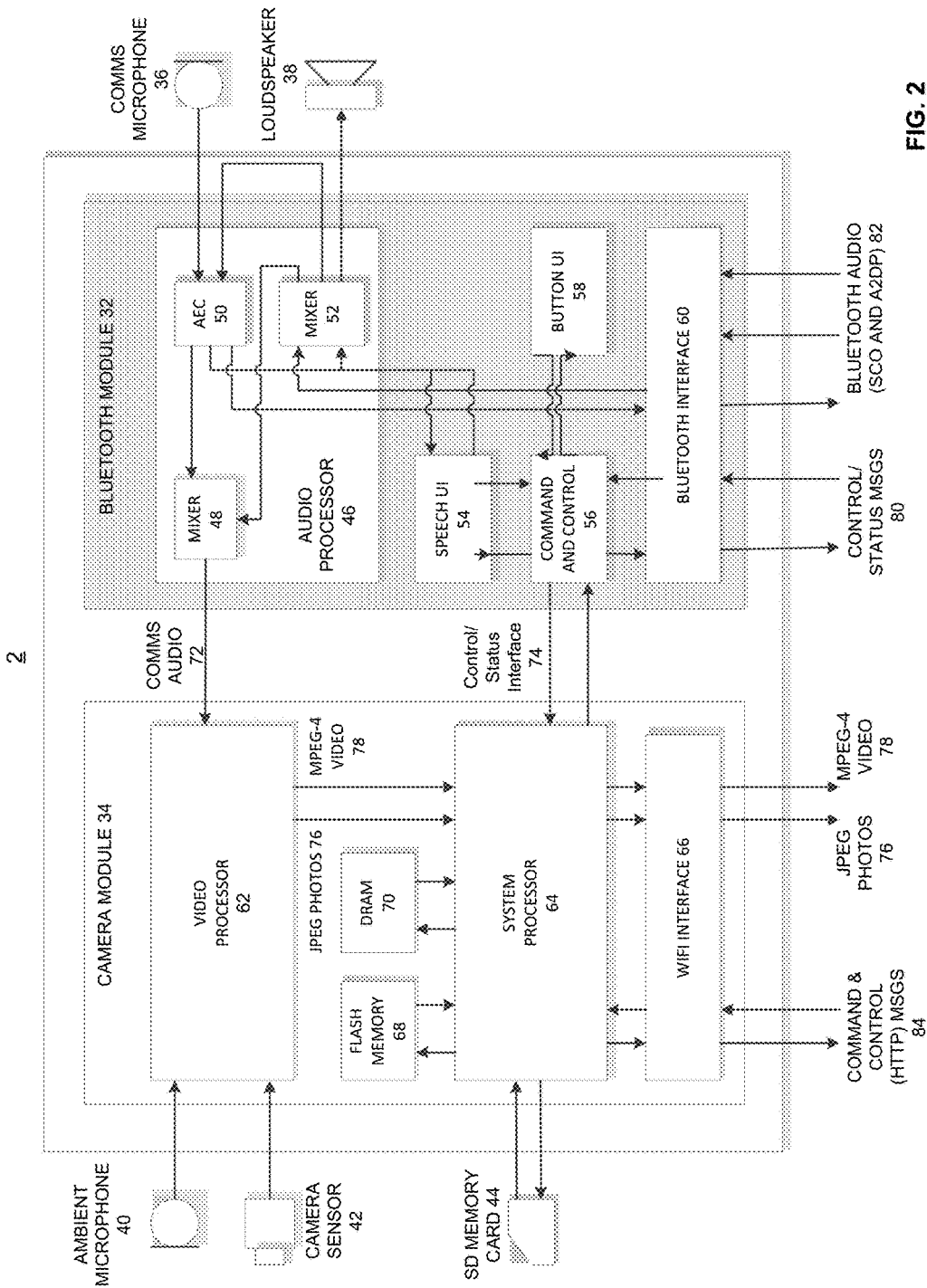
FIG. 2 illustrates a simplified block diagram of the video headset shown in FIG. 1 in one example.

FIG. 2 illustrates a simplified block diagram of the video headset 2 shown in FIG. 1 in one example. Video headset 2 includes a Bluetooth module 32 and camera module 34. In one example, Bluetooth module 32 is a dedicated Bluetooth system-on-chip (SOC) device that implements the Bluetooth radio communications protocol stack and contains an embedded processor for application-specific software (e.g., application program 56). The embedded software interfaces to a microphone 36 and loudspeaker 38 that are used for telephony, IP communications and the speech user interface (UI) 54. The speech UI 54 uses recorded speech samples, and/or a text-to-speech (TTS) engine, to notify the user about headset and camera events via the loudspeaker 38 and processes the microphone 36 signal with a speech recognition engine for user input. The embedded software also implements a conventional button UI 58. Application program 56 communicates with both the camera module 34, and any Bluetooth-connected devices. These communications channels may use any type of communications data protocol. The video headset 2 further includes a control and status interface 74 linking the Wi-Fi enabled camera module 34 and the Bluetooth module 32. Video headset 2 also includes a battery to provide power to headset components.

The Bluetooth module's embedded software includes audio processor 46 functions that implement an acoustic echo canceller (AEC) 50, which prevents coupling of received speech back into the transmit channel. In one example implementation, the audio processor 46 also utilizes mixer 52 to mix transmitted and received speech to generate a combined "communications audio" 72 stream that the camera module 34 includes in a MPEG-4 video/audio container.

In one example, camera module 34 uses a dedicated camera system-on-chip (SOC) device with ancillary flash memory 68, dynamic RAM (DRAM) 70, an SD card interface 44, and a Wi-Fi interface 66. The SOC includes two processors: a video processor 62 and a system processor 64. Video processor 62 drives the camera sensor 42 and also interfaces to a microphone 40 that captures ambient sound. It encodes video into one of the standard video/audio container formats, such as H.264 MPEG-4 AVC (Part 10). The system processor 64 is a general purpose processor that is used for system control and IP network communications. Camera sensor 42 may also be utilized to capture still shots in addition to capturing video. In one example, camera sensor 42 is a charged coupled device (CCD) sensor or a CMOS sensor.

The video headset 2 is connected to a smartphone, tablet, computer or other device (e.g., computing device 4) via its Bluetooth interface 60. Alternatively, video headset 2 may be plugged into an external device's USB port. In that use case the Bluetooth interface 60 is replaced by a USB interface.

Control and status messages 80 are transferred between the video headset 2 and computing device 4 using a data protocol over the Bluetooth radio channel. The Bluetooth module 32 relays relevant messages to and from the camera module 34, via the headset's internal control and status interface 74. This permits an application running on the computing device 4 (e.g., application program 24) to remotely control the camera and display its status. Also transferred over the Bluetooth radio channel is Bluetooth audio 82, which may utilize a Synchronous Connection Oriented (SCO) link or Advanced Audio Distribution Profile (A2DP) link.

In some use cases the computing device 4 connects to a remote web-client (e.g., computing device 18) on the Internet either directly or via a cloud server 16, as shown in FIG. 1. One example usage scenario is as follows. A field service technician (e.g., user 10) phones a colleague (e.g., user 20) to discuss how to fix a fault. During the course of the conversation the technician starts streaming video from his video headset 2 so that his colleague can help to inspect the faulty equipment. The video streaming system uses control and status messages 84 alongside the video stream data to support user authentication and access control. The bidirectional control channel uses standard IP network protocols such as HTTP requests, TCP sockets or web sockets. The control channel also enables the remote client (e.g., computing device 18) to send messages back to the computing device 4, which are then relayed to the video headset's camera module 34. The headset-wearer's colleague, who is remotely viewing the video stream, can switch on a flashlight at video headset 2 if there is insufficient light, or remotely focus and zoom the camera's lens, if the video headset supports these functions. This is useful because the service technician may not be viewing his own headset's video stream, so cannot adjust the image quality effectively.

In one example use case, the remote viewer (e.g., the colleague of the service technician) can start or stop video streaming instead of requiring the video headset wearer to press the video capture button himself. In this scenario, the video headset wearer hears voice prompts output at loudspeaker 38 to inform him of the actions taken by the remote viewer.

Making use of both Bluetooth interface 60 and Wi-Fi interface 66 on video headset 2 has advantages over using just Bluetooth or Wi-Fi individually. Bluetooth and Wi-Fi are both wireless communication protocols, but are optimized for different use cases. Bluetooth Classic supports moderate data transmission rate (up to 3 Mbit/sec) and is optimized for use on battery-powered devices that need to minimize power consumption. The Bluetooth SIG has defined a video distribution profile (VDP) for video streaming over Bluetooth. The Bluetooth VDP does not specify the maximum screen resolution or frame rate, which depend on the particular video codec that is chosen, the transmission range and the amount of radio interference. However, 320p and 15 fps is approximately the maximum resolution attainable for live video streaming.

In contrast, Wi-Fi supports higher data transmission rate than Bluetooth (up to 54 Mbit/sec for 802.11g), so is better suited to live streaming of high resolution video. In one example, video headset 2 records and streams video including 720p 30 fps (i.e., DVD quality), which is easily transferred across a Wi-Fi connection but could not be accommodated by the Bluetooth VDP. However, the disadvantage of Wi-Fi is its high power consumption. It consumes at least 100 times more power than Bluetooth when both are transferring data at the same rate, and still consumes significant power when idle. If the video headset's camera is controlled and configured via its Wi-Fi interface, the interface must be enabled at all times, which quickly drains the battery. Therefore prior Wi-Fi cameras either require a large and heavy battery or will have a short battery life.

Advantageously, to overcome these problems, video headset 2 uses the Bluetooth interface 60 for control, configuration and status reporting. In one example, Wi-Fi interface 66 is only enabled when required for video streaming. This minimizes power consumption, so that a small lightweight battery of video headset 2 can provide, for example, all-day standby and two hours of continuous video streaming or recording. The Wi-Fi interface 66 is enabled or disabled when video is started and stopped using headset button presses at button UI 58 or the application program 24 UI at computing device 4. The application program 24 also enables the headset's Wi-Fi interface 66, by sending commands over the Bluetooth link 6, when the user wants to remotely access the video headset's file system and download photos and video files. In one example, remote web client (e.g., computing device 18) can control video streaming and the Wi-Fi interface power state by sending commands to the computing device 4 via the IP network control channel. The computing device 4 relays the control message to the video headset 2 over the Bluetooth link 6 and onwards to the headset's camera module 34 via the internal control and status interface 74. In one example, internal control and status interface 74 is a wired serial port interface. In a further example, internal control and status interface 74 is a wireless interface.

Although shown separate from camera module 34 in FIG. 2, in further examples microphone 40, camera sensor 42, and SD memory card 44 may considered to be integrated with camera module 34. Similarly, in further examples, microphone 36 and loudspeaker 38 may be considered to be integrated with Bluetooth module 32.

In one example operation, the application program 56 includes executable instructions to conduct a voice call over the Bluetooth link 6 utilizing the Bluetooth interface 60 and transmit a video over the Wi-Fi link 8 utilizing the Wi-Fi communications interface 66, wherein the Bluetooth link 6 and Wi-Fi link 8 are in operation simultaneously. The application program 56 includes executable instructions to receive a control message (e.g., control and status messages 80) on the Bluetooth communication interface 60 and transmit the control message over the control and status interface 74 linking the Wi-Fi enabled camera module 34 and the Bluetooth module 32. The Wi-Fi enabled camera module 34 is transitioned from a power save mode to a full power mode responsive to the control message. During the power save mode, one or more components of the camera module 202 are in a no power or low power state.

In one example, the application program 56 further comprises executable instructions to receive a user speech at the microphone 36 and output a far end call participant (e.g., user 20) speech at the speaker 38 during the voice call. The video (e.g., MPEG-4 video 78) or still photo (e.g., JPEG photos 76) is captured with the camera sensor 42 during the voice call. The Bluetooth link 6 is formed between the video headset 2 and the computing device 4 and the Wi-Fi link 8 is formed between the video headset 2 and the computing device 4. The user speech is transmitted over the Bluetooth link 6 from the video headset 2 to the computing device 4 and the video is transmitted over the Wi-Fi link 8 from the video headset 2 to the computing device 4.

In one example, the camera microphone 40 is arranged at the video headset 2 to capture an audio corresponding to a captured video. For example, microphone 40 may be a directional microphone utilizing beamforming techniques directed in the same direction as camera sensor 42, or it may be an omnidirectional microphone that captures sounds from all directions. Microphone 36 is arranged to capture an audio corresponding to a video headset wearer speech. For example, microphone 36 may be placed in proximity to the wearer mouth using a microphone boom or may use beamforming techniques directed at the wearer's mouth.

Referring again to FIG. 1 and FIG. 2, in one example operation of system 100, Bluetooth link 6 and Wi-Fi link 8 are both established between a video headset 2 and a computing device 4, the Bluetooth link 6 and the Wi-Fi link 8 in operation concurrently. In one example, the Wi-Fi link 8 is a Wi-Fi Direct link. Wi-Fi Direct (WFD) is a standard that allows Wi-Fi devices to connect to each other with greatly reduced setup. Wi-Fi Direct embeds a software access point (Soft AP) into any device supporting Wi-Fi Direct. The "Wi-Fi Peer-to-Peer (P2P) Technical Specification", Version 1.1, as published by the Wi-Fi Alliance, defines a procedure to greatly simplify the connectivity between devices using a peer-to-peer link approach, and is hereby incorporated by reference. As a result Wi-Fi Direct devices can discover other WFD devices and launch a connection procedure, similar to the Bluetooth pairing process. A Wi-Fi chipset providing a high level of integration may be used. In one example, both video headset 2 and computing device 4 support the Wi-Fi Direct specification from the Wi-Fi Alliance, and thus may utilize a peer-to-peer Wi-Fi direct wireless link.

A user 10 speech is input at microphone 36 during a voice call. The user 10 speech is transmitted over the Bluetooth link 6 from the video headset 2 to the computing device 4. A far end call participant speech (e.g., user 20 speech) is output at speaker 38 during the voice call. Voice messages associated with an operation or status of the video camera may be output at the speaker 38. A video is captured with a camera sensor 42 during the voice call. Ambient audio is input at ambient microphone 40. The video is transmitted over the Wi-Fi link 8 from the video headset 2 to the computing device 4. In one embodiment, sound input at ambient microphone 40 is transmitted together with the video over the Wi-Fi link 8. In one embodiment, telecommunications call audio 72 including both the user 10 speech and the user 20 speech is transmitted together with the video and ambient sound over the Wi-Fi link 8.

In one example, a video camera control message is received from the computing device 4 at the video headset 2 over the Bluetooth link 6 during video transmission over the Wi-Fi link 8. In one embodiment, the video camera control message is received from the far end call participant over the Bluetooth link 6 during video transmission over the Wi-Fi link 8. The video camera control message is configured to modify one or more settings of the video camera or operation the video camera. One or more settings of the video camera or operation of the video camera are modified responsive to the video camera control message. The modified video is then transmitted over the Wi-Fi link 8 from the video headset 2 to the computing device 4.

In one example, the video camera control message is configured to start or stop transmission of the video by the camera sensor 42. The video camera control message may be configured to control a zoom setting, direction, or focus of the camera sensor 42. The video camera control message may also be configured to operate a video headset flashlight which illuminates the object being video captured. The video camera control message may also be configured to operate a laser pointer which pinpoints the object at the center of the camera's field of view. The video camera control message is also operable to terminate the Wi-Fi link 8 between the video headset 2 and the computing device 4. In one example, a voice message is output at the speaker 38 responsive to receiving the video camera control message from the far end call participant over the Bluetooth link 6 during video transmission over the Wi-Fi link 8.

In one example, the Wi-Fi link 8 between the computing device 4 and the video headset 2 is terminated following a termination of transmission of the video over the Wi-Fi link 8, thereby conserving battery power. Power to a video headset Wi-Fi transceiver may also be terminated.

In one embodiment, the Wi-Fi link 8 is terminated following termination of the video transmission and a power save mode is entered at camera module 34 (e.g., including Wi-Fi interface 66). At a later time, a video camera control message is received over the Bluetooth link 6 between the video headset 2 and the computing device 4. For example, the video camera control message is a start recording message. Responsive to the message, the power save mode at the video headset Wi-Fi module is exited and a Wi-Fi link 8 between the video headset 2 and the computing device 4 is formed.

In one example, a user 10 voice command is received at the microphone 36 operable to control operation of the video camera. For example, the voice command also controls operation of the camera microphone 40 arranged to capture the audio corresponding to the video captured by the video camera. The user 10 voice command may be converted to any type of video camera control message described herein.

Figure 3:
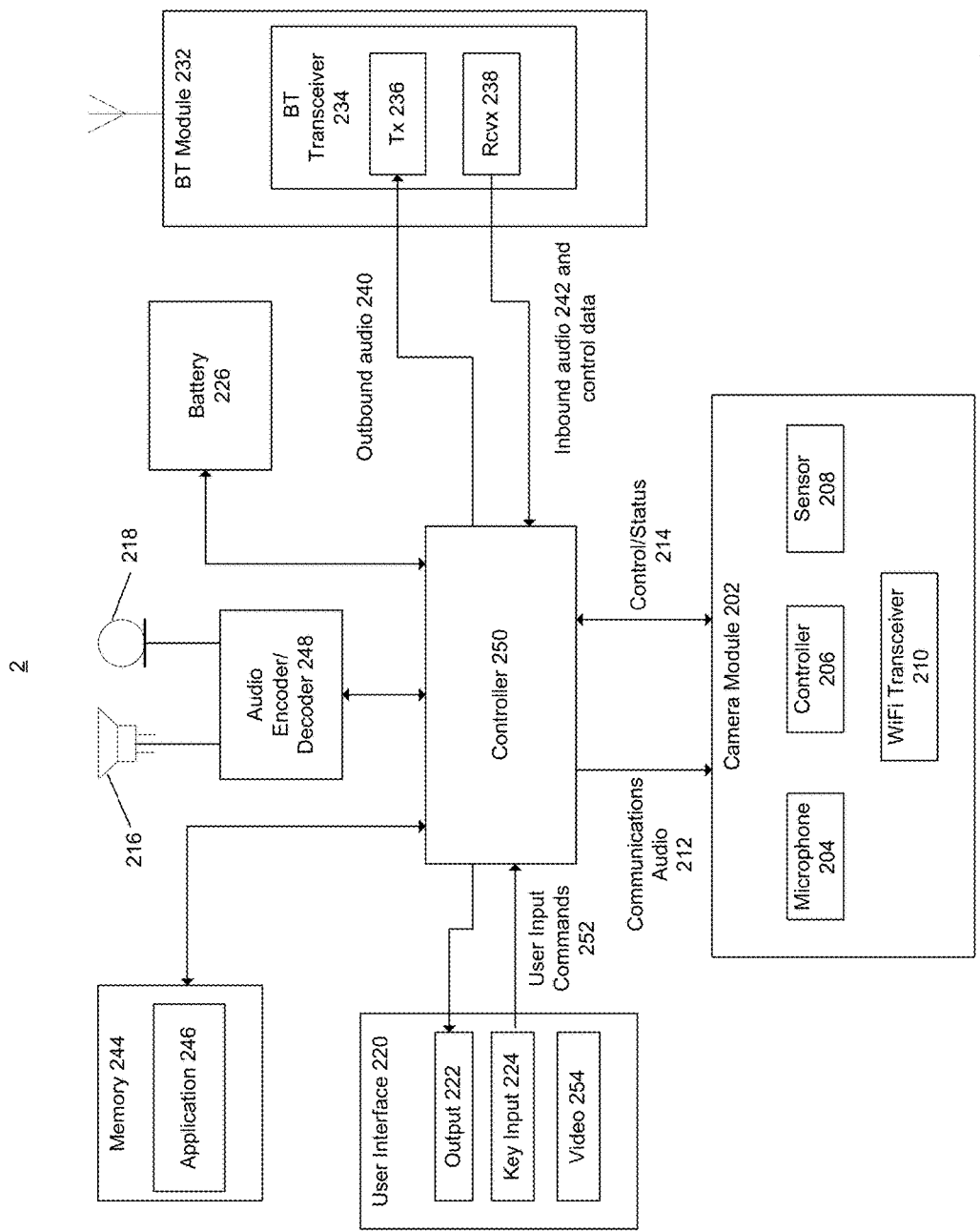
FIG. 3 illustrates a simplified block diagram of the video headset shown in FIG. 1 in a further example.

FIG. 3 illustrates a simplified block diagram of the video headset 2 shown in FIG. 1 in a further example. For clarity, not all components of the video headset 2 are illustrated. The video headset 2 embodiment shown in FIG. 3 includes a Bluetooth module 232, camera module 202, an audio encoder/decoder 248, memory 244, controller 250, user interface 220, speaker 216, microphone 218, and a battery 226.

The video headset 2 includes a controller 250 configured to execute code stored in a memory 244, including application program 246. Controller 250 may include multiple processors and/or co-processors, or one or more processors having multiple cores. The controller 250 and memory 244 may be provided on a single application-specific integrated circuit, or the controller 250 and the memory 244 may be provided in separate integrated circuits or other circuits configured to provide functionality for executing program instructions and storing program instructions and other data, respectively. Memory 244 also may be used to store temporary variables or other intermediate information during execution of instructions by controller 250. For example, memory 244 may include pre-stored audio messages for output through the device speaker 216. Memory 244 may include both volatile and non-volatile memory such as random access memory (RAM) and read-only memory (ROM).

User interface 220 includes a key input 224. Key input 224 includes a selectively enabled video function 254, volume up input and volume down input. Key input 224 also includes a hookswitch function. The user interface 220 may also include one or more output interfaces 222 typical to headsets, such as LED indicators or some form of a display. The speaker 216 may also be used as an interface output. The microphone 218 may also be used as an interface input, if the application 246 running on the controller 250 includes voice command capabilities.

In one example, video function 254 is a user input button utilized to start and stop video streaming or recording. In one example, the Wi-Fi transceiver 210 is enabled or disabled when video is started or stopped using headset button presses at video function 254 or the application program 24 UI at computing device 4. User interface 220, and in particular video function 254, can be any combinations of visual interfaces, tactile interfaces, and/or an audio interface that allow the user to input commands.

Bluetooth module 232 includes a transceiver 234 having a transmitter 236 and a receiver 238. The Bluetooth transceiver 234 is operable to form a Bluetooth communications link with computing device 4. A wireless signal transmitted by transmitter 236 includes outbound audio 240. Inbound audio 242 and control data is received by receiver 238 and sent to controller 250. For example, the control data includes video camera control messages received from computing device 4. Audio encoder/decoder 248 is used for processing a digital audio signal and an analog audio signal as known in the art.

Controller 250 is operable to receive user input commands 252 from user interface 220. In one example, controller 250 is part of a Bluetooth chip set. Controller 250 also receives inbound audio or audio files for output by speaker 216 following decoding by audio encoder/decoder 248.

Camera module 202 includes a microphone 204, controller 206, camera sensor 208, and Wi-Fi transceiver 210. Camera module 202 may receive a communications audio 212 from controller 250 and transmit the communications audio 212 using Wi-Fi transceiver 210. For example, communications audio 212 includes both the user 10 speech and the user 20 speech during a voice call. Advantageously, the Bluetooth module 232 is used for control, configuration and status reporting whereas Wi-Fi transceiver 210 is only enabled when required for video streaming. In one example, camera module 202 is substantially similar or the same as camera module 34 described in reference to FIG. 2. A control/status interface 214 is disposed between camera module 202 and controller 250. In one example, control/status interface 214 is substantially similar or the same in structure and function to control/status interface 74 described in reference to FIG. 2.

Memory 244 stores an application program 246 executed by controller 250 to perform video headset operations. In one example operation, the application program 246 includes executable instructions to conduct a voice call over a Bluetooth link utilizing the Bluetooth module 232 and transmit a video over a Wi-Fi link utilizing Wi-Fi transceiver 210, where the Bluetooth link and Wi-Fi link are in operation simultaneously.

In one embodiment, the application program 246 further includes executable instructions to receive a control message (e.g., a video camera control or status message) at the Bluetooth module 232 and transmit the control message over the control and status interface 214 linking the camera module 202 and other headset components. One or more components of the camera module 202 are transitioned from a power save mode to a full power mode responsive to the control message. For example, one or more of Wi-Fi transceiver 210, camera sensor 208, and microphone 204 may be transitioned from a power save mode to a full power mode. In one example, the application program 246 performs operations substantially similar to application program 56 described in reference to FIG. 2.

Figure 4:
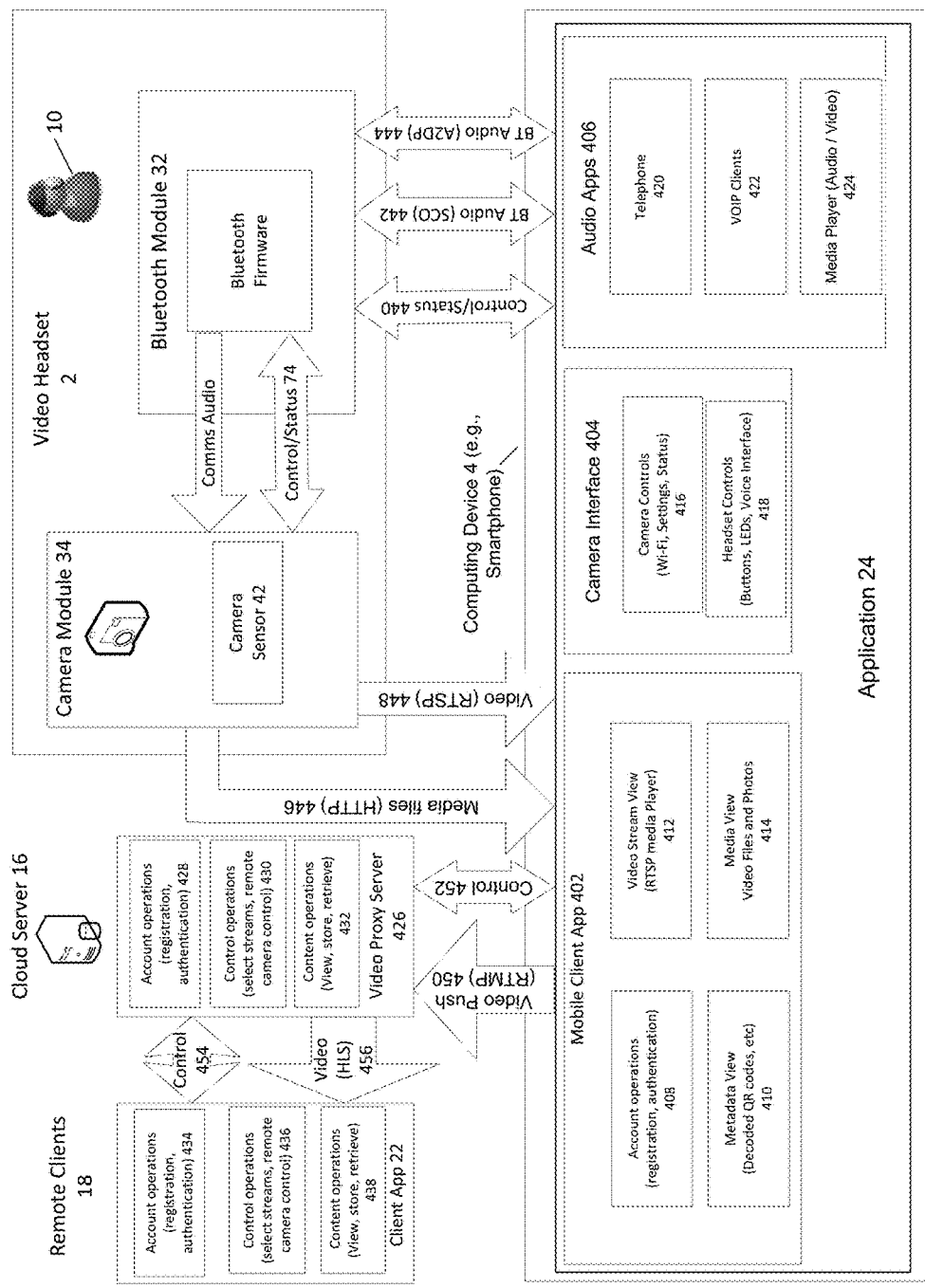
FIG. 4 illustrates the system shown in FIG. 1 in one example usage scenario.

FIG. 4 illustrates the system shown in FIG. 1 in one example usage. A video headset 2 as shown in FIG. 2 contains two main functional modules: a Wi-Fi-connected camera module 34 and a Bluetooth module 32 that implements the headset's audio functions and provides Bluetooth connectivity to external devices.

The system also includes a computing device 4 (e.g., a Bluetooth-connected smartphone, tablet computer or laptop computer), which runs an application program 24 that is operable to control and configure the headset 2 (including camera module 34). For example, computing device 4 may be an iOS or Android device. Remote web clients (e.g., computing device 18) can view the headset's live video stream, and control or configure the headset 2 via cloud server 16. Video and control messages are routed between remote client computing device 18, server 16, and computing device 4 over the IP network. In an alternative system architecture, communication between the computing device 4 and remote web client computing device 18 is routed over a direct peer connection between the two devices, instead of via server 16.

The system utilizes a variety of physical layer types. Communications over a Bluetooth link between video headset 2 and computing device 4 include control/status messages 440, Bluetooth Audio (SCO) 442, and Bluetooth audio (A2DP) 444. Communications over a Wi-Fi link between video headset 2 and computing device 4 include live streaming video (RTSP) 448 and media files (HTTP) 446. Communications over a serial port interface within video headset 2 include control/status messages on control/status interface 74. Communications over a mobile or fixed WAN link between computing device 4 and cloud server 16 include live streaming video (RTMP) 450 and control messages 452. Communications over a mobile or fixed WAN link between computing device cloud server and remote client computing device 18 include video (HLS) 456 and control messages 454.

In the example shown in FIG. 4, application program 24 at computing device 4 includes a client application module 402, camera interface module 404, and audio applications module 406. Client application module 402 includes account operations module 408, Metadata view module 410, Video Stream View module 412, and Media View module 414. Camera interface module 404 includes camera controls module 416 and headset controls module 418. Audio applications module 406 includes telephone module 420, VoIP client module 422, and Media Player 424.

Cloud server 16 includes a video proxy server 426 including account operations module 428, control operations module 430, and content operations module 432. At remote client computing device 18, a web client application program 22 includes account operations module 434, control operations module 436, and content operations module 438.

The video headset's camera module 34 and Bluetooth module 32 are largely independent, but they are coupled via a control and status interface 74. For example, control and status interface 74 is a bidirectional serial port with hardware handshaking (4-wire interface). In further examples, control and status interface 74 can be any cable or wireless interface that supports reliable data transmission rate of a few Kbit/sec. Being independent, the camera module 34 can be controlled from the Bluetooth headset microphone voice recognition command/control, whilst the camera records video and audio using its own separate microphone(s).

The modular design, with a clearly defined interface between the Wi-Fi-connected camera module 34 and Bluetooth module 32, enables product variants with different form factors to be created quickly and easily for specific applications. For example the camera module 32 and Bluetooth module 34 can be combined on a single PCB, to minimize cost, for a video headset 2 that has large ear-cups with plenty of space for electronics. For a small, sleek headset 2 the camera module 34 and Bluetooth module 32 can be separated and mounted on the left and right ear respectively, to minimize bulk and ensure a good balance. A serial interface running through the neck-band links the two modules. For hard-hat mounting the camera module 34 mounts on the outer shell, linked to a separate earbud Bluetooth module 32 by a cable or wireless interface.

Linking the camera and headset audio functions via a control and status interface 74 provides enhanced functionality, relative to a stand-alone audio headset and IP webcam. The interface enables the Bluetooth module 32 to configure the camera and control its operation: e.g., change Wi-Fi settings, take photos, start and stop video capture, etc. It also enables the headset Bluetooth module 32 to read the camera's configuration settings and receive status messages about camera events: e.g., video started, video stopped, photo taken, battery charge level, memory usage, Wi-Fi network status, etc.

The enhanced functionality advantages provided by coupling the camera module 34 and Bluetooth module 32 are numerous. For example, the camera module 34 can be controlled by voice commands, such as: "take photo", "start video" and "check status", which enables the video headset's core functions to be used hands-free. The Bluetooth module 32 processes audio from the headset microphone. When it detects a voice command it sends the corresponding control message to the camera module 34.

The Bluetooth module 32 plays voice prompts in the headset's loudspeaker, which inform the user about camera events such as "photo taken", "video started", "video stopped", "battery low", "25 percent memory capacity remaining" and "memory full". Some voice prompts provide feedback that user-initiated actions, invoked using voice commands, the headset's button UI or a connected device, have succeeded. This enhances the headset-wearer's user experience, because visual feedback from the headset's LEDs is ineffective while the headset 2 is being worn.

In various embodiments, the techniques of FIGS. 5A-5B and 6A-6B discussed below may be implemented as sequences of instructions executed by one or more electronic systems. For example, the instructions may be stored by the video headset 2 or the instructions may be received by the video headset 2 (e.g., via a network connection).

Figure 5A:
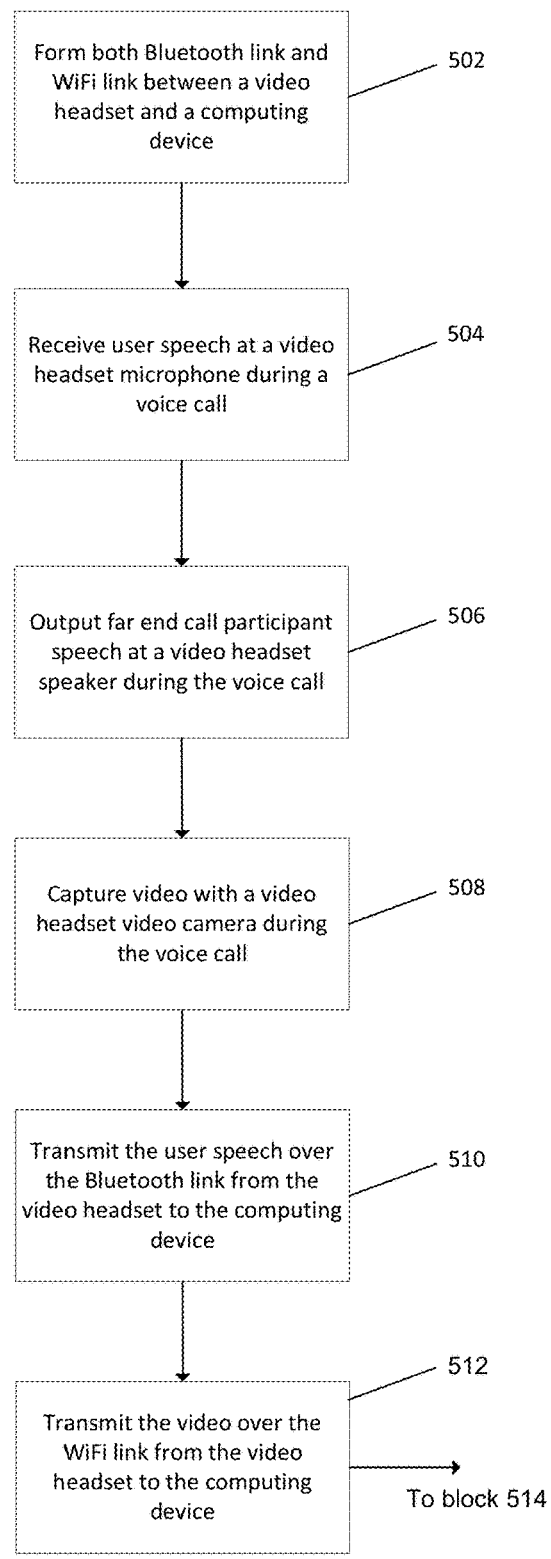
FIGS. 5A and 5B are a flow diagram illustrating operation of a video headset in one example.
Figure 5B:
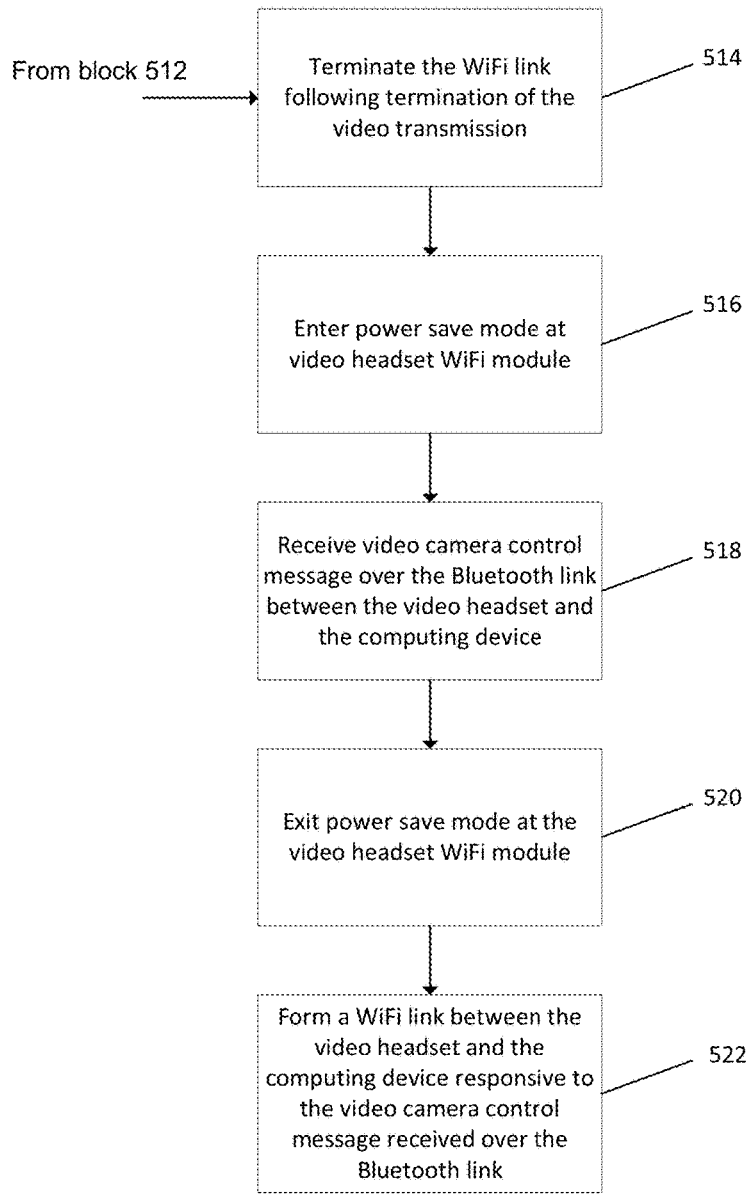

FIGS. 5A and 5B are a flow diagram illustrating operation of a video headset in one example. At block 502, both a Bluetooth link and a Wi-Fi link are between a video headset and a computing device, the Bluetooth link and the Wi-Fi link in operation concurrently. In one example, the computing device is a smartphone, tablet computer, or laptop. In one example, the Wi-Fi link is a Wi-Fi Direct link.

At block 504, a user speech is received at a video headset microphone during a voice call. For example, the user speech is part of a conversation with a far end call participant during the voice call. In one example, a user voice command may also be received at the video headset microphone operable to control operation of the video camera. For example, operation of the video camera includes operation of a second video headset microphone arranged to capture the audio corresponding to the video captured by the video camera.

At block 506, a far end call participant speech is output at a video headset speaker during the voice call. Voice messages associated with an operation or status of the video camera may also be output at the video headset speaker.

At block 508, a video is captured with a video headset video camera during the voice call. An audio may also be captured with a second video headset microphone, the second video headset microphone arranged to capture the audio associated with the video.

At block 510, the user speech is transmitted over the Bluetooth link from the video headset to the computing device. At block 512, the video is transmitted over the Wi-Fi link from the video headset to the computing device. In one example, a telecommunications voice call audio including both the user speech and the far end call participant speech is transmitted together with the video and the ambient audio that is associated with the video over the Wi-Fi link. In one example the party viewing the video stream may choose to listen to either the telecommunications voice call audio, or the ambient audio, or both simultaneously. In one example, a video camera control message may be received from the computing device over the Bluetooth link during video transmission over the Wi-Fi link.

In one example, the process further includes receiving a video camera control message from the far end call participant over the Bluetooth link during video transmission over the Wi-Fi link, the video camera control message configured to modify one or more settings of the video camera or operation the video camera. In one example, a voice message is output at the video headset speaker responsive to receiving the video camera control message.

One or more settings of the video camera or operation of the video camera are modified responsive to the video camera control message. In various examples, the video camera control message is configured to (1) control a zoom setting, direction, or focus of the video headset video camera; (2) operate a video headset flashlight; (3) start or stop transmission of the video by the video headset video camera; (4) terminate the Wi-Fi link between the video headset and the computing device; (5) operate a video headset laser pointer that pinpoints the center of the camera's field of view. If the captured video is modified responsive to the video camera control message, a modified video is transmitted over the Wi-Fi link from the video headset to the computing device.

At block 514, the Wi-Fi link is terminated following termination of the video transmission. At block 516, a power save mode is entered at a video headset Wi-Fi module. In one example, during power save mode, power to a video headset Wi-Fi transceiver is terminated or disabled.

At block 518, a video camera control message is received over the Bluetooth link between the video headset and the computing device. For example, the video camera control message is a start record or transmission message. At block 520, the power save mode at the video headset Wi-Fi module is exited responsive to the video camera control message. At block 522, a Wi-Fi link is formed between the video headset and the computing device responsive to the video camera control message received over the Bluetooth link.

Figure 6A:
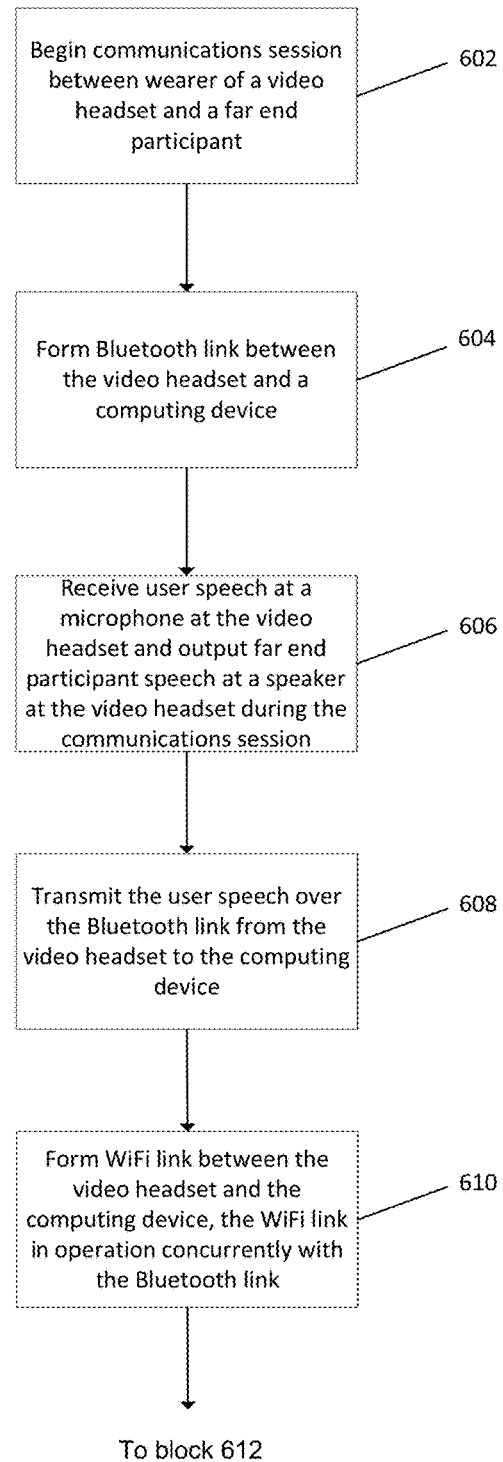
FIGS. 6A and 6B are a flow diagram illustrating operation of a video headset in a further example.
Figure 6B:
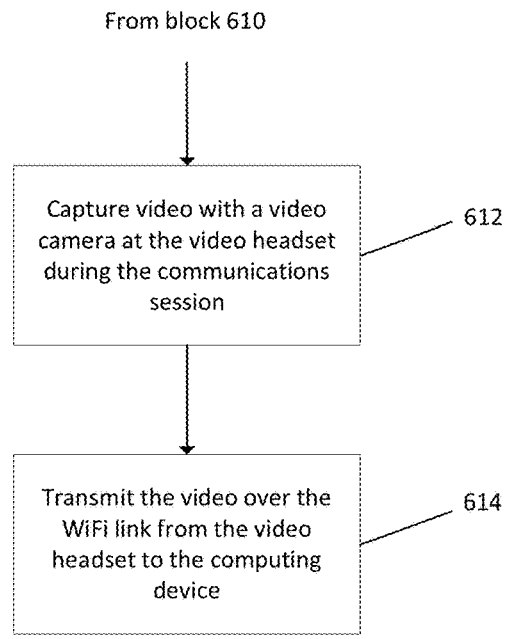

FIGS. 6A and 6B are a flow diagram illustrating operation of a video headset in a further example. At block 602, a communications session between a wearer of a video headset and a far end participant is begun. In one example, the communications session is a telecommunications voice call conducted between the computing device and a telephony device at the far end participant.

At block 604, a Bluetooth link between the video headset and a computing device is formed. At block 606, a user speech is received at a microphone at the video headset and a far end participant speech is output at a speaker at the video headset during the communications session. At block 608, the user speech is transmitted over the Bluetooth link from the video headset to the computing device.

At block 610, a Wi-Fi link is formed between the video headset and the computing device, the Wi-Fi link in operation concurrently with the Bluetooth link. At block 612, a video is captured with a video camera at the video headset during the communications session. At block 614, the video is transmitted over the Wi-Fi link from the video headset to the computing device. In one example, transmitting the video over the Wi-Fi link includes streaming the video during the communications session. In one example, a call audio including both the user speech and the far end participant speech is also transmitted together with the video over the Wi-Fi link.

In one example, a video camera control message is received from the computing device over the Bluetooth link during video transmission over the Wi-Fi link, the message initiated by the video headset wearer at the computing device user interface. In one example, the process further includes receiving a video camera control message from the far end participant over the Bluetooth link during video transmission over the Wi-Fi link, the video camera control message configured to modify one or more settings of the video camera or operation the video camera. One or more settings of the video camera or operation of the video camera is modified responsive to the video camera control message. Where the video is modified responsive to the video camera control message, a modified video is transmitted over the Wi-Fi link from the video headset to the computing device.

In one example, the process further includes terminating the Wi-Fi link following termination of the video transmission and entering a power save mode at a Wi-Fi module at the video headset. A video camera control message is subsequently received over the Bluetooth link between the video headset and the computing device. The power save mode at the Wi-Fi module is exited and a new Wi-Fi link is formed between the video headset and the computing device responsive to the video camera control message received over the Bluetooth link.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices. Use of the term "camera" or "video camera" encompasses devices which are capable of capturing both video and still images.

Thus, the scope of the invention is intended to be defined only in terms of the following claims as may be amended, with each claim being expressly incorporated into this Description of Specific Embodiments as an embodiment of the invention.

What is claimed is:

1. A method comprising:
    forming both a Bluetooth link and an IEEE 802.11 link between a video headset and a computing device, the Bluetooth link and the IEEE 802.11 link in operation concurrently;
    receiving a user speech at a video headset microphone during a voice call;
    outputting a far end call participant speech at a video headset speaker during the voice call;
    capturing a video with a video headset video camera during the voice call;
    transmitting the user speech over the Bluetooth link from the video headset to the computing device and transmitting the video over the IEEE 802.11 link from the video headset to the computing device;
    terminating the IEEE 802.11 link following termination of a transmission of the video and entering a power save mode at a video headset IEEE 802.11 module;
    receiving a video camera control message over the Bluetooth link between the video headset and the computing device; and
    exiting the power save mode at the video headset IEEE 802.11 module and forming a new IEEE 802.11 link between the video headset and the computing device responsive to the video camera control message received over the Bluetooth link.

2. The method of claim 1, further comprising transmitting a telecommunications call audio comprising both the user speech and the far end call participant speech together with the video over the IEEE 802.11 link.

3. The method of claim 1, further comprising receiving a video camera control message from the computing device over the Bluetooth link during video transmission over the IEEE 802.11 link.

4. The method of claim 1, wherein the IEEE 802.11 link is a Wi-Fi Direct link.

5. The method of claim 1, further comprising capturing an audio with a second microphone at the video headset, the second microphone arranged to capture the audio associated with the video.

6. The method of claim 1, further comprising:
    receiving a video camera control message from a far end call participant over the Bluetooth link during video transmission over the IEEE 802.11 link, the video camera control message configured to modify one or more settings of the video headset video camera or operation the video headset video camera;
    modifying one or more settings of the video headset video camera or operation of the video headset video camera responsive to the video camera control message; and
    transmitting a modified video over the IEEE 802.11 link from the video headset to the computing device, the video modified responsive to the video camera control message.

7. The method of claim 6, wherein the video camera control message from the far end call participant over the Bluetooth link during video transmission over the IEEE 802.11 link is configured to control a zoom setting, direction, or focus of the video headset video camera.

8. A method comprising:
    forming both a Bluetooth link and an IEEE 802.11 link between a video headset and a computing device, the Bluetooth link and the IEEE 802.11 link in operation concurrently;
    receiving a user speech at a video headset microphone during a voice call;
    outputting a far end call participant speech at a video headset speaker during the voice call;
    capturing a video with a video headset video camera during the voice call; and
    transmitting the user speech over the Bluetooth link from the video headset to the computing device and transmitting the video over the IEEE 802.11 link from the video headset to the computing device;
    receiving a video camera control message from a far end call participant over the Bluetooth link during video transmission over the IEEE 802.11 link, the video camera control message configured to modify one or more settings of the video headset video camera or operation the video headset video camera;
    modifying one or more settings of the video headset video camera or operation of the video headset video camera responsive to the video camera control message;
    transmitting a modified video over the IEEE 802.11 link from the video headset to the computing device, the video modified responsive to the video camera control message; and
    outputting a voice message at the video headset speaker responsive to receiving the video camera control message from the far end call participant over the Bluetooth link during video transmission over the IEEE 802.11 link.

9. A video headset comprising:
    a battery;
    a microphone;
    a speaker;
    a Wi-Fi enabled camera module comprising:
        a camera video sensor;
        a camera microphone;
        a camera processor; and
        an IEEE 802.11 communications interface;
    a Bluetooth enabled module comprising:
        a processor;
        a Bluetooth communications interface;
    a control and status interface linking the Wi-Fi enabled camera module and the Bluetooth enabled module; and
    a memory storing an application program comprising executable instructions to conduct a voice call over a Bluetooth link utilizing the Bluetooth communications interface and transmit a video over an IEEE 802.11 link utilizing the IEEE 802.11 communications interface, wherein the Bluetooth link and IEEE 802.11 link are in operation simultaneously, and wherein the application program further comprises executable instructions to:
        receive a control message on the Bluetooth communications interface and transmit the control message over the control and status interface linking the Wi-Fi enabled camera module and the Bluetooth enabled module; and
        initiate transition of the Wi-Fi enabled camera module from a power save mode to a full power mode responsive to the control message.

10. The video headset of claim 9, wherein the application program further comprises executable instructions to:
    receive a user speech at the microphone and output a far end call participant speech at the speaker during the voice call;
    capture the video with the camera video sensor during the voice call;

form the Bluetooth link between the video headset and a computing device and the IEEE 802.11 link between the video headset and the computing device; and transmit the user speech over the Bluetooth link from the video headset to the computing device and transmit the video over the IEEE 802.11 link from the video headset to the computing device.

11. The video headset of claim 9, wherein the control and status interface comprises a wired serial interface.

12. The video headset of claim 9, further comprising a flashlight or a laser pointer.

13. A video headset comprising:
a battery;
a microphone;
a speaker;
a Wi-Fi enabled camera module comprising:
  a camera video sensor;
  a camera microphone;
  a camera processor; and
  an IEEE 802.11 communications interface;
a Bluetooth enabled module comprising:
  a processor;
  a Bluetooth communications interface; and
  a memory storing an application program comprising executable instructions to conduct a voice call over a Bluetooth link utilizing the Bluetooth communications interface and transmit a video over an IEEE 802.11 link utilizing the IEEE 802.11 communications interface, wherein the Bluetooth link and IEEE 802.11 link are in operation simultaneously; and
a control and status interface linking the Wi-Fi enabled camera module and the Bluetooth enabled module, wherein the camera microphone is arranged at the video headset to capture an audio corresponding to a captured video and the microphone is arranged to capture an audio corresponding to a video headset wearer speech.

14. A method comprising:
beginning a communications session between a wearer of a video headset and a far end participant;
forming a first communications protocol link between the video headset and a computing device;
receiving a user speech at a microphone at the video headset and outputting a far end participant speech at a speaker at the video headset during the communications session;
transmitting the user speech over the first communications protocol link from the video headset to the computing device;
forming a second communications protocol link between the video headset and the computing device, the second communications protocol link in operation concurrently with the first communications protocol link;
capturing a video with a video camera at the video headset during the communications session; and
transmitting the video over the second communications protocol link from the video headset to the computing device;
terminating the second communications protocol link following termination of a transmission of the video and entering a power save mode at a second communications protocol module at the video headset;
receiving a video camera control message over the first communications protocol link between the video headset and the computing device; and
exiting the power save mode at the second communications protocol module and forming a new second communications protocol link between the video headset and the computing device responsive to the video camera control message received over the first communications protocol link.

15. The method of claim 14, wherein the communications session is a telecommunications voice call conducted between the computing device and a telephony device at the far end participant.

16. The method of claim 14, wherein transmitting the video over the second communications protocol link comprises streaming the video during the communications session.

17. The method of claim 14, further comprising receiving a second video camera control message from the computing device over the first communications protocol link during video transmission over the second communications protocol link.

18. The method of claim 14, further comprising:
receiving a video camera control message from the far end participant over the first communications protocol link during video transmission over the second communications protocol link, the video camera control message configured to modify one or more settings of the video camera or operation the video camera;
modifying one or more settings of the video camera or operation of the video camera responsive to the video camera control message; and
transmitting a modified video over the second communications protocol link from the video headset to the computing device, the video modified responsive to the video camera control message.

19. The method of claim 14, wherein the first communications protocol comprises Bluetooth and the second communications protocol comprises an IEEE 802.11 protocol.

20. The method of claim 8, wherein the video camera control message from the far end call participant over the Bluetooth link during video transmission over the IEEE 802.11 link is configured to control a zoom setting, direction, or focus of the video headset video camera.

21. The video headset of claim 13, wherein the application program further comprises executable instructions to:
receive a user speech at the microphone and output a far end call participant speech at the speaker during the voice call;
capture the video with the camera video sensor during the voice call;
form the Bluetooth link between the video headset and a computing device and the IEEE 802.11 link between the video headset and the computing device; and
transmit the user speech over the Bluetooth link from the video headset to the computing device and transmit the video over the IEEE 802.11 link from the video headset to the computing device.

22. The video headset of claim 13, wherein the control and status interface comprises a wired serial interface.

* * * * *